United States Patent
Kim et al.

(10) Patent No.: US 10,325,534 B2
(45) Date of Patent: Jun. 18, 2019

(54) DISPLAY DEVICE

(71) Applicant: Samsung Display Co., Ltd., Yongin-si (KR)

(72) Inventors: Kyung Hee Kim, Yongin-si (KR); Yun Hee Kwak, Yongin-si (KR); Dong Yeon Son, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 265 days.

(21) Appl. No.: 14/978,338

(22) Filed: Dec. 22, 2015

(65) Prior Publication Data
US 2016/0300545 A1 Oct. 13, 2016

(30) Foreign Application Priority Data

Apr. 10, 2015 (KR) .................. 10-2015-0051091

(51) Int. Cl.
*G09G 5/00* (2006.01)
*G09G 3/00* (2006.01)
(Continued)

(52) U.S. Cl.
CPC ......... *G09G 3/006* (2013.01); *G02F 1/13452* (2013.01); *G09G 3/20* (2013.01);
(Continued)

(58) Field of Classification Search
CPC ........... G09G 3/006; G09G 2300/0408; G09G 2300/0426; G09G 3/20; G09G 2300/0421;
(Continued)

(56) References Cited

U.S. PATENT DOCUMENTS 7,495,737 B2    2/2009  Kim et al.
8,780,311 B2 *  7/2014  Ogasawara ........... G02F 1/1339
                                                          349/149
(Continued)

FOREIGN PATENT DOCUMENTS

KR   10-2007-0017625    2/2007
KR   10-2008-0102730    11/2008
(Continued)

*Primary Examiner* — Steven T Sawyer
*Assistant Examiner* — Paresh H Paghadal
(74) *Attorney, Agent, or Firm* — H.C. Park & Associates, PLC

(57) ABSTRACT

A display device including a display panel including a chip mounting region and a driver mounted on the chip mounting region, the driver configured to provide signals to a display region of the display device to display an image on the display region. The display panel includes a first connection line, a second connection wire line, and a third connection wire line sequentially disposed in the chip mounting region; a first shorting bar, a second shorting bar, and a third shorting bar correspondingly connected to the first connection wire line, the second connection wire line, and the third connection wire line; and a bridge wire line configured to electrically connect at least one of the first, second, and third shorting bars and the second connection wire line. Neighboring connection wire lines of the first, second, and third connection wire lines are disposed in different layers.

12 Claims, 3 Drawing Sheets

(51) Int. Cl.
*G09G 3/20* (2006.01)
*G02F 1/1345* (2006.01)

(52) U.S. Cl.
CPC ........ *G02F 1/1345* (2013.01); *G02F 1/13454* (2013.01); *G02F 1/13458* (2013.01); *G09G 2300/0408* (2013.01); *G09G 2300/0421* (2013.01); *G09G 2300/0426* (2013.01)

(58) Field of Classification Search
CPC ............. G02F 1/13452; G02F 1/13454; G02F 1/1345; G02F 1/13458; G02F 2001/1356; G02F 2001/1358
See application file for complete search history.

(56) References Cited

U.S. PATENT DOCUMENTS

| | | | |
|---|---|---|---|
| 8,975,905 B2 | 3/2015 | Kim et al. | |
| 9,275,932 B2* | 3/2016 | Yoshida | G02F 1/13452 |
| 9,443,889 B2* | 9/2016 | Xu | H01L 27/1288 |
| 9,508,751 B2* | 11/2016 | Cai | H01L 27/124 |
| 2002/0089614 A1* | 7/2002 | Kim | G02F 1/1309 |
| | | | 349/40 |
| 2003/0117536 A1* | 6/2003 | Jeon | G02F 1/136286 |
| | | | 349/40 |
| 2007/0007557 A1* | 1/2007 | Kwak | G09G 3/3677 |
| | | | 257/239 |
| 2007/0052896 A1* | 3/2007 | Eom | G02F 1/136259 |
| | | | 349/139 |
| 2008/0204618 A1 | 8/2008 | Jung et al. | |
| 2009/0294771 A1* | 12/2009 | Kim | G02F 1/136204 |
| | | | 257/59 |
| 2012/0169346 A1* | 7/2012 | Huang | G02F 1/1309 |
| | | | 324/414 |
| 2012/0326148 A1* | 12/2012 | Ko | H01L 22/14 |
| | | | 257/49 |
| 2013/0057799 A1* | 3/2013 | Zhuang | G02F 1/13452 |
| | | | 349/54 |
| 2013/0307761 A1* | 11/2013 | Kwak | G09G 3/3696 |
| | | | 345/87 |
| 2013/0321730 A1* | 12/2013 | Huang | G09G 3/006 |
| | | | 349/41 |
| 2014/0240279 A1* | 8/2014 | Hwang | G06F 3/044 |
| | | | 345/174 |
| 2016/0141315 A1* | 5/2016 | Shin | H01L 21/47635 |
| | | | 257/43 |

FOREIGN PATENT DOCUMENTS

| | | |
|---|---|---|
| KR | 10-2012-0006626 | 1/2012 |
| KR | 10-2013-0114997 | 10/2013 |

* cited by examiner

DISPLAY DEVICE

CROSS-REFERENCE TO RELATED APPLICATION

This application claims priority from and the benefit of Korean Patent Application No. 10-2015-0051091, filed on Apr. 10, 2015, which is hereby incorporated by reference for all purposes as if fully set forth herein.

BACKGROUND

Field

Exemplary embodiments relate to a display device.

Discussion of the Background

Various display devices have been developed to display information. Some of these display device include a liquid crystal display device (LCD), a plasma display panel (PDP), an electrophoretic display device, and an organic light emitting display (OLED) device. Regardless of the exact display device, these devices include a display panel for displaying an image and a driving circuit unit for driving the display panel.

The driving circuit may be connected to the display panel by a tape carrier package (TCP) method or a chip-on-glass (COG) method. In the TCP method, a driving integrated circuit is attached to a tape that is attached to the display panel. In the COG method, a driving integrated circuit is directly attached to a substrate of the display panel. Lately, more display devices have been made with driving circuits attached to the display panel according the COG method. The COG method is advantageous because it helps reduce the area occupied the driving integrated circuit while also helping to reduce the cost of manufacturing display devices.

A display device using the COG method includes attaching the driving integrated circuit on a chip mounting region of the substrate. The chip mounting region includes output pads electrically connected to output bumps of the driving integrated circuit and input pads electrically connected to input bumps of the driving integrated circuit to supply external signals to the driving integrated circuit.

After the display panel is manufactured, a driving test is performed on the manufactured display panel. The display device using the COG method is formed by including test pads and shorting bars in the chip mounting region to perform the driving test. The driving test determines whether the display panel is driven by applying test signals to the test pads connected to the shorting bars through the shorting bars in a state where the driving integrated circuit is not mounted in the chip mounting region.

Consumers demand thinner and more compact display devices that require thinner and more compact display panels. For display panels to meet these consumer demands, the driving integrated circuit needs to be reduced. Thus, much research is needed in order to reduce the area of the chip mounting region formed on the substrate in accordance with the size of the driving integrated circuit.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device for assuring a valid area in a driving chip mounting region.

Additional aspects will be set forth in the detailed description which follows, and, in part, will be apparent from the disclosure, or may be learned by practice of the inventive concept.

An exemplary embodiment discloses a display device including a display panel including a chip mounting region and a driver mounted on the chip mounting region, the driver configured to provide signals to a display region of the display device to display an image on the display region. The display panel includes a first connection wire line, a second connection wire line, and a third connection wire line sequentially disposed in the chip mounting region; a first shorting bar, a second shorting bar, and a third shorting bar correspondingly connected to the first connection wire line, the second connection wire line, and the third connection wire line; and a bridge wire line configured to electrically connect at least one of the first, second, and third shorting bars and the second connection wire line. Neighboring connection wire lines of the first, second, and third connection wire lines are disposed in different layers.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
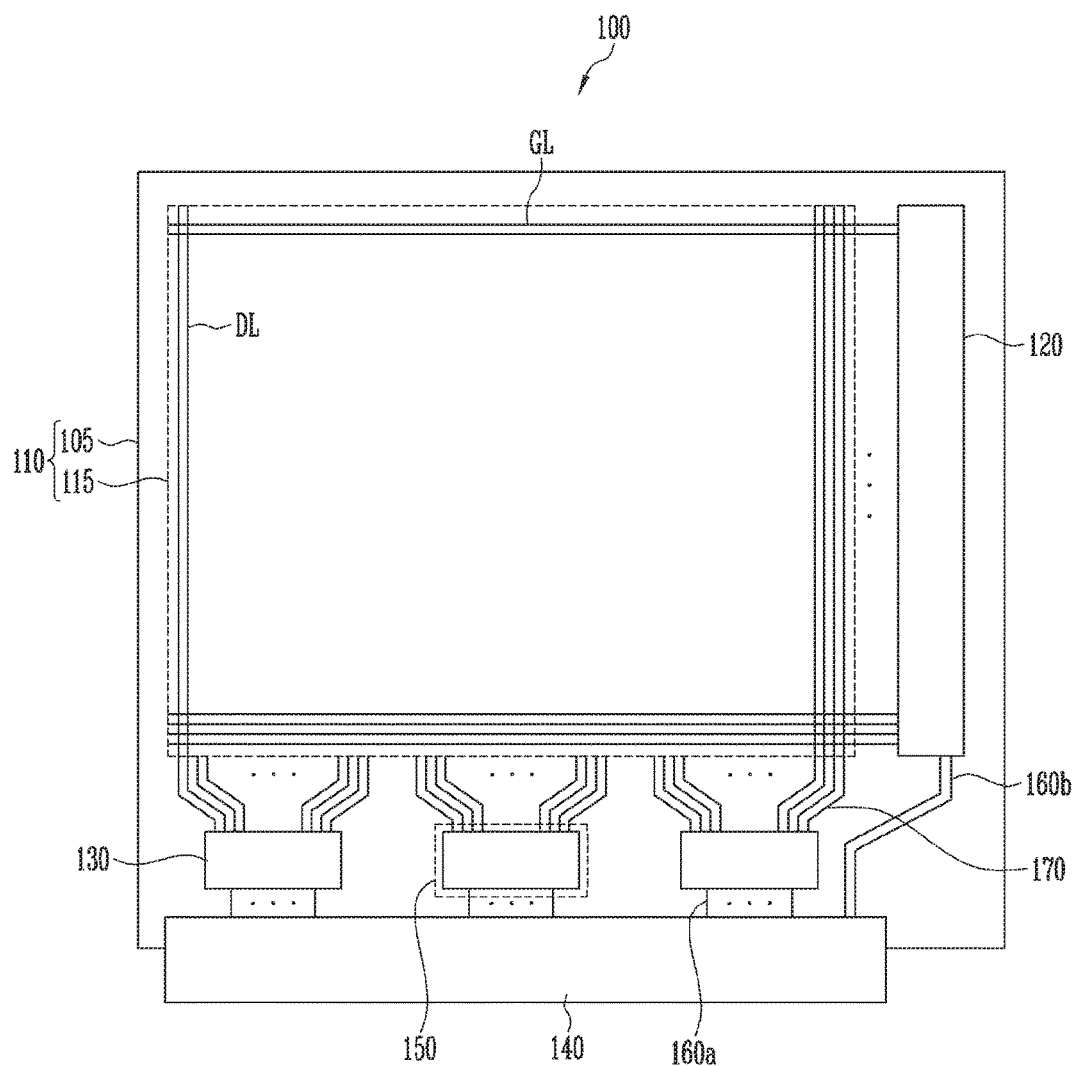
FIG. 1 is a view schematically illustrating a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a view schematically illustrating a display device 100 according to an exemplary embodiment.

Referring to FIG. 1, the display device 100 may include a substrate 110, a first driver 120, second drivers 130 positioned on some parts of the substrate 110, and a flexible printed circuit board (FPCB) 140 for providing a driving signal to the first driver 120 and the second drivers 130.

The substrate 110 may include a display region 115 for displaying an image, a non-display region 105 positioned around the display region 115, and chip mounting regions 150 provided in the non-display region 105. The substrate 110 may adhere to a second substrate (not shown) that faces the substrate 110 by a uniform distance and may form a display panel.

The display region 115 may include pixel units (not shown) that display the image. The display region 115 may also include gate lines GL and data lines DL that provide driving signals to the pixel units.

The non-display region 105 is a remaining region that excludes the display region 115 defined in the substrate 110. The first driver 120 and the second driver 130 may be formed in the non-display region 105. The first driver 120 may provide gate signals to the gate lines GL and the second driver 130 may provide data signals to the data lines DL.

The first driver 120 may be formed of thin film transistors (TFT) (not shown) directly on the substrate 110 in order to provide the gate signals to the gate lines GL.

The second driver 130 may be mounted in the non-display region 105 as an integrated circuit (IC) by using a COG method.

The first driver 120 and the second driver 130 may be connected to an external PCB (not shown) through the FPCB 140. The first driver 120 and the second driver 130 may receive various control signals and driving voltages for driving the display device 100.

The first driver 120 may receive the various control signals and driving voltages from the FPCB 140 through a line-on-glass (LOG) 160b. Outer lead bonding (OLB) wire lines 160a may be positioned between the second drivers 130 and the FPCB 140 and electrically connect the FPCB 140 and the second drivers 130.

In addition, link lines 170 may be formed in the non-display region 105 for supplying the data signals from the second driver 130 to the data lines DL.

The chip mounting regions 150 may be positioned in the non-display region 105 of the substrate 110. The second drivers 130 may be mounted in the chip mounting regions 150 for supplying the data signals to the data lines DL of the display region 115. The second drivers 130 may be mounted in the chip mounting regions 150 after a driving test process for the data lines DL of the display region 115.

Figure 2:
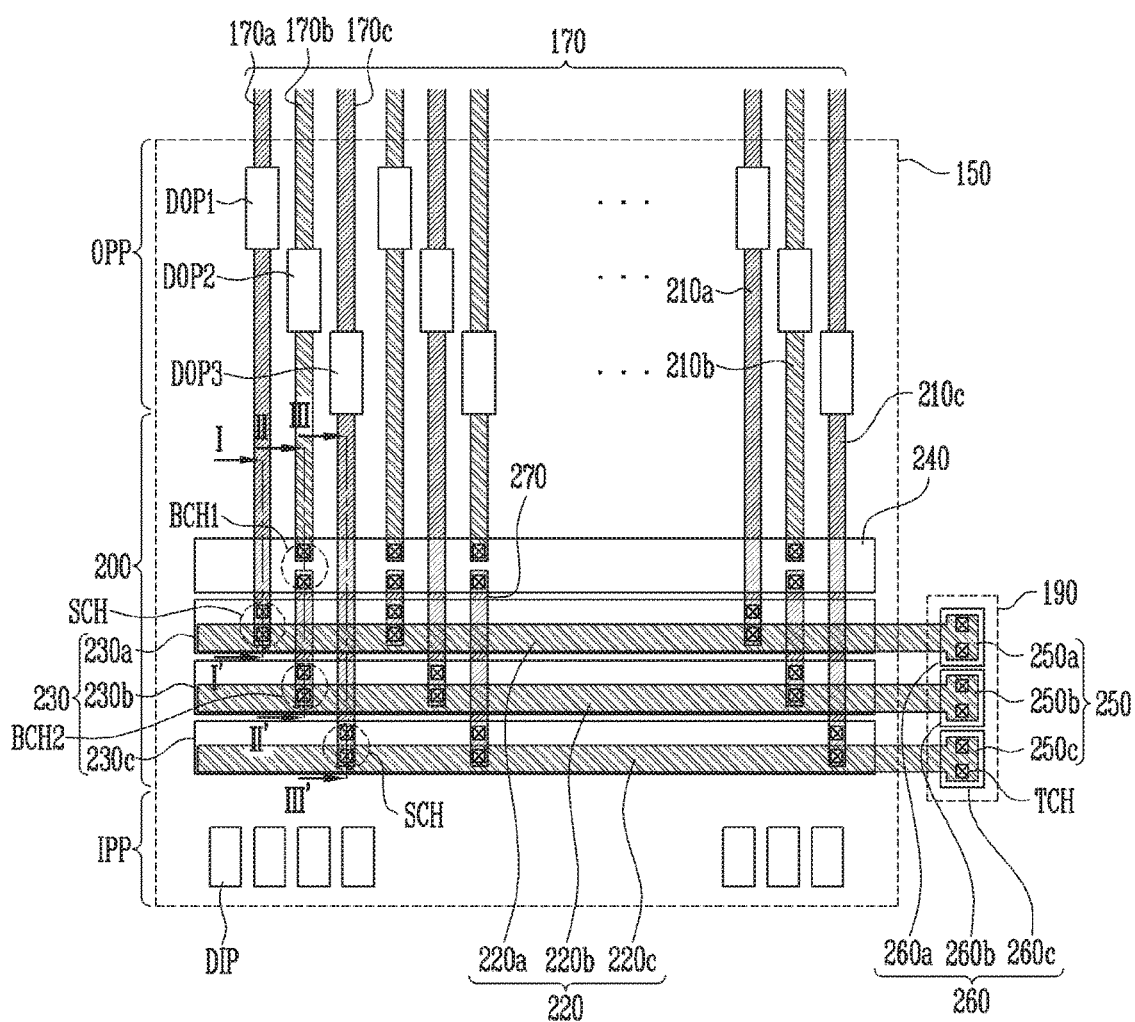
FIG. 2 is a view illustrating the chip mounting region of FIG. 1.

As illustrated in FIG. 2, the chip mounting region 150 may include an input pad unit IPP connected to the second drivers 130 (see FIG. 1), an output pad unit OPP, and a driving circuit test unit 200 positioned between the two pad units IPP and OPP.

The input pad unit IPP may include data input pads DIP electrically connected to input bumps (not shown) formed in the second driver 130. The data input pads DIP may be electrically connected to the FPCB 140 through the OLE wire line 160a formed on the substrate 110 (see FIG. 1).

The output pad unit OPP may include first, second, and third data output pads DOP1, DOP2, and DOP3 electrically connected to output bumps (not shown) formed in the second driver 130.

A first end of a first data output pad DOP1 may be electrically connected to a first data link line 170a. A first end of a second data output pad DOP2 may be electrically connected to a second data link line 170b. A first end of a third data output pad DOP3 may be electrically connected to a third data link line 170c.

The first, second, and third data link lines 170a, 170b, and 170c form the link line 170.

A second end of the first data output pad DOP1 may be electrically connected to a first connection wire line 210a. A second end of the second data output pad DOP2 may be electrically connected to a second connection wire line 210b. A second end of the third data output pad DOP3 may be electrically connected to a third connection wiring line 210c. The first and third connection wire lines 210a and 210c may be formed in the same layer on the substrate 110. The second connection wire line 210b may be formed in a different layer from the first and third connection wire lines 210a and 210c.

Among the sequentially arranged first, second, and third connection wire lines 210a, 210b, and 210c, neighboring connection wire lines may be positioned in different layers on the substrate 110.

The first, second, and third data output pads DOP1, DOP2, and DOP3 may not be arranged in parallel but may be arranged in a staggered pattern along at least three columns so that a pitch between neighboring pads may be reduced.

The driving circuit test unit 200 may include a shorting bar 220 electrically connected to at least one of the first, second, and third connection wire lines 210a, 210b, and 210c. The driving circuit test unit 200 may also include a test pad 250 for providing test signals to the shorting bar 220 and a contact pad unit 260 electrically connected to the test pad 250 through a test contact hole TCH.

The test pad 250 may include first, second, and third test pads 250a, 250b, and 250c connected to an auto probe pad 190 to supply first, second, and third test signals supplied from an auto probe (not shown) to the shorting bar 220.

The contact pad unit 260 may include first, second, and third contact pads 260a, 260b, and 260c electrically connected to the first, second, and third test pads 250a, 250b, and 250c through the test contact hole TCH. The first, second, and third contact pads 260a, 260b, and 260c may be formed of at least one of an opaque conductive material and a transparent conductive material.

The shorting bar 220 may include a first shorting bar 220a that extends from the first test pad 250a, a second shorting bar 220b that extends from the second test pad 250b, and a third shorting bar 220c that extends from the third test pad 250c. The first, second, and third shorting bars 220a, 220b, and 220c may be positioned in the same layer as the second connection wire line 210b and may be formed of the same conductive material as the second connection wire line 210b.

The first shorting bar 220a may be electrically connected to the first connection wire line 210a. The second shorting bar 220b may be electrically connected to the second connection wire line 210b. The third shorting bar 220c may be electrically connected to the third connection wire line 210c. In other words, at least one of the first, second, and third shorting bars 220a to 220c may be electrically connected to at least one of the first, second, and third connection wire lines 210a, 210b, and 210c.

The first shorting bar 220a may receive the first test signal from the first test pad 250a. The second shorting bar 220b may receive the second test signal from the second test pad 250b. The third shorting bar 220c may receive the third test signal from the third test pad 250c.

The first test signal may be a red (R) data signal, the second test signal may be a green (G) data signal, and the third test signal may be a blue (B) data signal.

In addition, the driving circuit test unit 200 may include a contact bar 230 positioned on the shorting bar 220 with an insulating layer (not shown) interposed between the shorting bar 220 and the contact bar 230. The driving circuit test unit 200 may include a bridge wire line 270 for electrically connecting the second connection wire line 210b and the shorting bar 220. The driving circuit test unit 200 may include a bridge contact bar 240 for electrically connecting the bridge wire line 270 and the second connection wire line 210b.

The contact bar 230 may include a first contact bar 230a positioned on the first shorting bar 220a, a second contact bar 230b positioned on the second shorting bar 220b, and a third contact bar 230c positioned on the third shorting bar 220c. The contact bar 230 may be formed of at least one of an opaque conductive material and a transparent conductive material. Since the contact bar 230 is formed in the same layer as a pixel electrode (not shown) provided in the display region 115 (see FIG. 1), the contact bar 230 may be formed of a transparent conductive material such as indium tin oxide (ITO) and indium zinc oxide (IZO).

The first contact bar 230a may be electrically connected to the first shorting bar 220a positioned under the first contact bar 230a through the shorting contact hole SCH. The second contact bar 230b may be electrically connected to the second shorting bar 220b positioned under the second contact bar 230b through the shorting contact hole SCH. The third contact bar 230c may be connected to the third shorting bar 220c positioned under the third contact bar 230c through the shorting contact hole SCH.

The bridge wire line 270 may connect the second connection wire line 210b and the shorting bar 220 to prevent short circuiting between the second connection wire line 210b and the shorting bar 220. The second connection wire line 210b and the shorting bar 220 may be formed in the same layer.

The bridge wire line 270 may be positioned in the same layer as the first connection wire line 210a and the third connection wiring line 210c. The bridge wire line may be formed of the same conductive material as the first connection wire line 210a and the third connection wire line 210c. Thus, the bridge wire line 270 may be positioned under the second connection wire line 210b with an insulating layer (not shown) interposed between the bridge wire line 270 and the second connection wire line 210b.

Since the second connection wire line 210b and the shorting bar 220 may be electrically connected through the bridge wire line 270, the test signals supplied to the shorting bar 220 may be supplied to the second connection wire line 210b through the bridge wire line 270.

The bridge contact bar 240 may be positioned in the same layer as the contact bar 230 and may be formed of the same conductive material as the contact bar 230. In other words, the bridge contact bar 240 may be formed of an opaque conductive material or a transparent conductive material. As previously mentioned, the bridge contact bar may electrically connect the second connection wire line 210b and the bridge wire line 270. Since the bridge contact bar 240 is formed in the same layer as a pixel electrode (not shown) provided in the display region 115 (see FIG. 1), the bridge contact bar 240 may be formed of a transparent conductive material such as ITO and IZO.

Through a first bridge contact hole BCH1, the second connection wire line 210b and a first side of the bridge wire line 270 may be electrically connected. A second side of the bridge wire line 270 may be connected to the shorting bar 220 through a second bridge contact hole BCH2.

The first and third connection wire lines 210a and 210c may be positioned under the shorting bar 220 with an insulating layer (not shown) interposed between the shorting bar 220 and the first and third connection wire lines 210a and 210c. Therefore, the first and third connection wire lines 210a and 210c may be directly electrically connected to the corresponding shorting bar 220 through the shorting contact hole SCH. More specifically, the first and third connection wire lines 210a and 210c may be directly electrically connected to the shorting bar 220 without the bridge wire line 270. The first and third connection wire lines 210a and 210c may receive the test signals from the shorting bar 220.

Since the first and third connection wire lines 210a and 210c are directly electrically connected to the shorting bar 220 without the bridge wire line 270, a valid space as large as an area of the bridge wire line 270 may be secured in a vertical direction of the first and third connection wire lines 210a and 210c in the chip mounting region 150.

In addition, since the first, second, and third data output pads DOP1, DOP2, and DOP3 are not arranged in parallel but are arranged in zigzags along at least three columns, a pitch between data output pads is reduced so that a size of the second driver 130 mounted in the chip mounting region 150 may be reduced.

Figure 3:
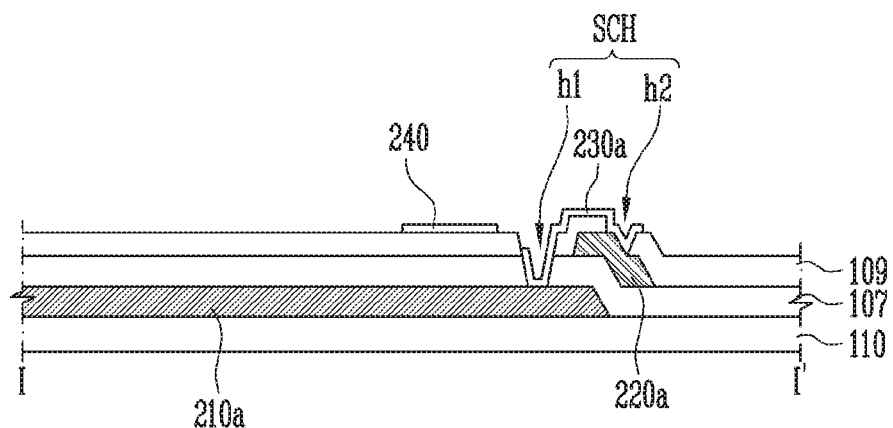
FIG. 3 is a sectional view taken along section line I-I' of the chip mounting region of FIG. 2.

FIG. 3 is a sectional view taken along section line I-I' of the chip mounting region of FIG. 2.

Referring to FIG. 2 and FIG. 3, the chip mounting region 150 may include the first connection wire line 210a formed on the substrate 110, a first insulating layer 107 formed on the first connection wire line 210a, the first shorting bar 220a formed on the first insulating layer 107, a second insulating layer 109 formed on the first shorting bar 220a, and the first contact bar 230a electrically connecting the first connection wire line 210a and the first shorting bar 220a through a first contact hole h1 and a second contact hole h2.

The first connection wire line 210a may include a low resistance opaque conductive material. For example, the first correction wire line 210a may include at least one of aluminum (Al), an Al alloy, tungsten (W), copper (Cu), nickel (Ni), chrome (Cr), molybdenum (Mo), titanium (Ti), platinum (Pt), and tantalum (Ta). In addition, the first connection wire line 210a may have a multi-layer structure stacking a transparent conductive material such as ITO and IZO and an opaque conductive material.

The first insulating layer 107 may have a single layer or multi-layer structure of an inorganic insulating layer (i.e., at least one of a silicon oxide layer, a silicon oxy-nitride layer, a silicon nitride-oxide layer, a silicon nitride layer, and a tantalum oxide layer). The first insulating layer 107 may be patterned to include an opening that exposes a part of the first connection wire line 210a.

The first shorting bar 220a may have a single layer structure including at least one of Molybdenum (Mo), titanium (Ti), silver (Ag), and an alloy of at least one of Molybdenum (Mo), titanium (Ti), silver (Ag). The first shorting bar 220a may have a double layer or multi-layer structure including a low resistance material in order to reduce line resistance such as at least one of Mo, Al, and Ag. The first shorting bar 220a may be formed by sequentially stacking multiple conductive layers to reduce wire line resistance and may be formed of the same conductive material as the first connection wire line 210a. The first shorting bar 220a may receive the first test signal from the first test pad 250a.

The second insulating layer 109 may include at least one of an inorganic insulating material and an organic insulating material. The second insulating layer 109 may be patterned to include a first opening corresponding to the opening of the first insulating layer 107 and a second opening that exposes a portion of the first shorting bar 220a.

For ease of reference, the first opening of the second insulating layer 109 is referred to as a first contact hole h1 and the second opening of the second insulating layer 109 is referred to as a second contact hole h2. The shorting contact hole SCH may include the first contact hole h1 and the second contact hole h2.

The first contact bar 230a positioned on the second insulating layer 109 may be electrically connected to the first connection wire line 210a through the first contact hole h1 and may be electrically connected to the first shorting bar 220a through the second contact hole h2. More specifically, the first connection wire line 210a and the first shorting bar 220a may be electrically connected through the first contact bar 230a.

Therefore, the first test signal provided from the first test pad 250a to the first shorting bar 220a may be supplied to the first connection wire line 210a through the first contact bar 230a. The first test signal supplied to the first connection wire line 210a may be finally supplied to the data lines DL of the display region 115 through the first data link line 170a.

Figure 4:
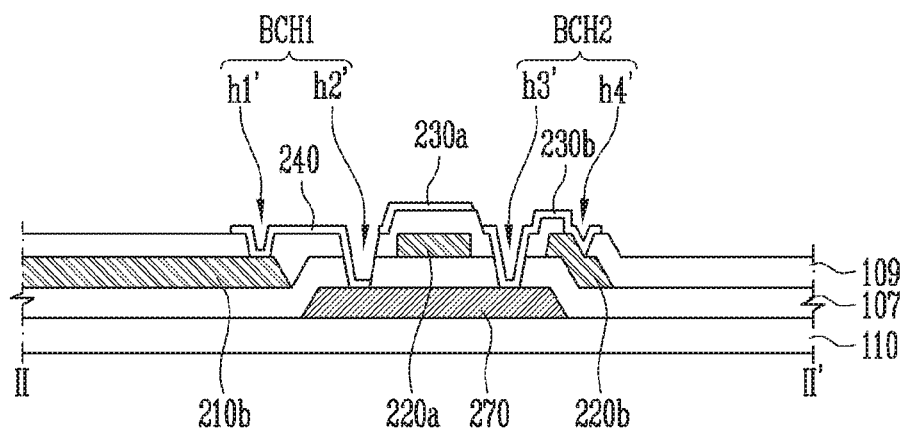
FIG. 4 is a sectional view taken along sectional line II-II' of the chip mounting region of FIG. 2.

FIG. 4 is a sectional view taken along the section line II-II' of the chip mounting region of FIG. 2.

Referring to FIGS. 2 and 4, the chip mounting region 150 may include the bridge wire line 270 formed on the substrate 110, the first insulating layer 107 formed on the bridge wire line 270, the second connection wire line 210b/the first shorting bar 220a/the second shorting bar 220b formed on the first insulating layer 107 and separated from the first insulating layer 107 by a uniform distance, the second insulating layer 109 formed on the second connection wire line 210b/the first shorting bar 220a/the second shorting bar 220b, the bridge contact bar 240 for electrically connecting the second connection wire line 210b and the bridge wire line 270 through the first bridge contact hole BCH1, and the second contact bar 230b for electrically connecting the bridge wire line 270 and the second shorting bar 220b through the second bridge contact hole BCH2.

The bridge wire line 270 may be positioned in the same layer as the first connection wire line 210a and may be formed of the same conductive material as the first connection wire line 210a.

The first insulating layer 107 maybe patterned to include the first and second openings that expose parts of the bridge wire line 270.

The second insulating layer 109 may surround each of the second connection wire line 210b, the first shorting bar 220a, and the second shorting bar 220b and may electrically insulate the second connection wire line 210b, the first shorting bar 220a, and the second shorting bar 220b from each other. The second insulating layer 109 may be patterned to include a first opening that exposes a portion of the second connection wire line 210b, a second opening corresponding to the first opening of the first insulating layer 107, a third opening corresponding to the second opening of the first insulating layer 107, and a fourth opening that exposes a portion of the second shorting bar 220b.

For ease of reference, the first opening of the second insulating layer 109 is referred to as the first contact hole h1', the second opening of the second insulating layer 109 is referred to as the second contact hole h2', the third opening of the second insulating layer 109 is referred to as a third contact hole h3', and the fourth opening of the second insulating layer 109 is referred to as a fourth contact hole h4'.

The first bridge contact hole BCH1 may include the first contact h1' and the second contact hole h2' and the second bridge contact hole BCH2 includes the third contact hole h3' and the fourth contact hole h4'.

The bridge contact bar 240 may be positioned on the second insulating layer 109 and may be electrically connected to the second connection wire line 210b through the first contact hole h1 and may be electrically connected to the bridge wire line 270 through the second contact hole h2. In other words, the second connection wire line 210b and the bridge wire line 270 may be electrically connected through the bridge contact bar 240.

The second contact bar 230b may be separated from the bridge contact bar 240 by a uniform distance on the second insulating layer 109. The second contact bar 230b may be electrically connected to the bridge wire line 270 through the third contact hole h3' and may be electrically connected to the second shorting bar 220b through the fourth contact hole h4'. In other words, the second shorting bar 220b and the bridge wire line 270 may be electrically connected through the second contact bar 230b.

The second test signal provided from the second test pad 250b to the second shorting bar 220b may be supplied to the bridge wire line 270 through the second contact bar 230b. The second test signal supplied to the bridge wire line 270 may be supplied to the second connection wire line 210b through the bridge contact bar 240. The second test signal supplied to the second connection wire line 210b may be finally supplied to the data lines DL of the display region 115 through the second data link line 170b.

Figure 5:
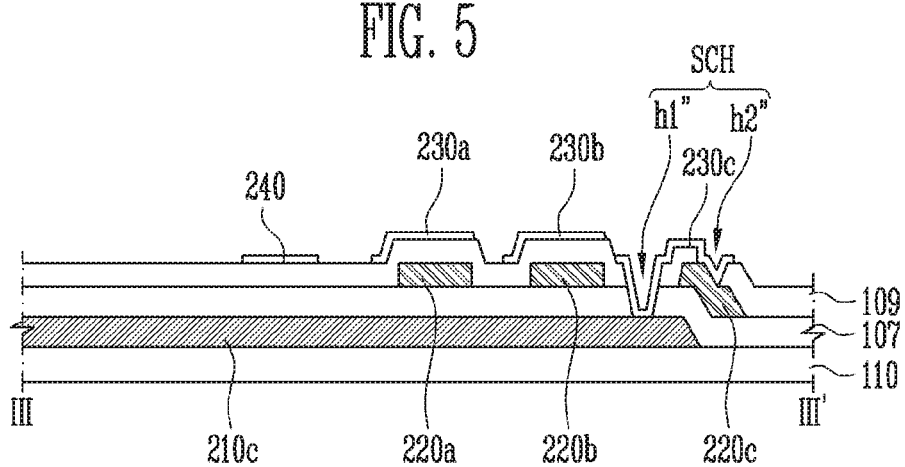
FIG. 5 is a sectional view taken along sectional line III-III' of the chip mounting region of FIG. 2.

FIG. 5 is a sectional view taken along section line III-III' of the chip mounting region of FIG. 2.

Referring to FIGS. 2 and 5, the chip mounting region 150 may include the third connection wire line 210c formed on the substrate 110, the first insulating layer 107 formed on the third connection wire line 210c, the first, second, and third shorting bars 220a, 220b, and 220c formed on the first insulating layer 107, the second insulating layer 109 formed on the first, second, and third shorting bars 220a, 220b, and 220c, and the first, second, and third contact bars 230a, 230b, and 230c formed on the second insulating layer 109.

The first insulating layer 107 may be patterned to include an opening that exposes a portion of the third connection wire line 210c.

The second insulating layer 109 may be patterned to include a first opening corresponding to the opening of the first insulating layer 107 and a second opening that exposes a portion of the third shorting bar 220c.

For ease of reference, the first opening of the second insulating layer 109 may be referred to as the first contact hole h1 and the second opening of the second insulating layer 109 is referred to as the second contact hole h2". The shorting contact hole SCH' includes the first contact hole h1" and the second contact hole h2".

The third contact bar 230c may be positioned on the second insulating layer 109 and may be electrically connected to the third connection wire line 210c through the first contact hole h1. The third contact bar 230c may be electrically connected to the third shorting bar 220c through the second contact hole h2. In other words, the third connection wire line 210c and the third shorting bar 220c may be electrically connected through the third contact bar 230c.

Therefore, the third test signal provided from the third test pad 250c to the third shorting bar 220c may be supplied to the third connection wire line 210c through the third contact bar 230c. The third test signal supplied to the third connection wire line 210c may be finally supplied to the data lines DL of the display region 115 through the third data link line 170c.

The exemplary embodiments above describe that some of the connection wire lines connected to output pads are directly connected to the shorting bars in the chip mounting region so that a wire line integration area may be assured in the chip mounting region.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
   a display panel comprising a chip mounting region and a driver mounted on the chip mounting region, the driver configured to provide signals to a display region of the display device to display an image on the display region, wherein the display panel, comprises:
   a first connection wire line, a second connection wire line, and a third connection wire line sequentially disposed in the chip mounting region;
   a first shorting bar, a second shorting bar, and a third shorting bar correspondingly connected to the first connection wire line, the second connection wire line, and the third connection wire line;
   a bridge wire line configured to electrically connect at least one of the first, second, and third shorting bars and the second connection wire line; and
   a bridge contact bar disposed on the second connection wire line,
   wherein:
   the first connection wire line and the third connection wire line are disposed in the same layer and comprise the same conductive material;
   the second connection wire line is disposed on the first and third connection wire lines;
   the bridge wire line is disposed in the same layer as the first connection wire line and the third connection wire line; and
   the second connection wire line is disposed on the bridge wire line.

2. The display device of claim 1, wherein the bridge contact bar electrically connects the second connection wire line and a first side of the bridge wire line through a first contact hole.

3. The display device of claim 2, wherein the second connection wire line, the bridge wire line, and the bridge contact bar are disposed in different layers.

4. The display device of claim 2, wherein the bridge wire line is disposed in a lowermost layer, the second connection wire line is positioned on the bridge wire line, and the bridge contact bar is disposed on the second connection wire line.

5. The display device of claim 4, wherein a first insulating layer is disposed between the bridge wire line and the second connection wire line, and a second insulating layer is disposed between the second connection wire line and the bridge contact bar.

6. The display device of claim 2, wherein the bridge contact bar comprises a transparent conductive material.

7. The display device of claim 2, wherein a second side of the bridge wire line and at least one shorting bar are electrically connected through a second contact hole.

8. The display device of claim 1, further comprising:
a first contact bar, a second contact bar, and a third contact bar disposed on the first, second, and third shorting bars, respectively, and the first, second, and third contact bars are configured to electrically connect at least one of the first, second, and third connection wire lines and at least one of the first, second, and third shorting bars.

9. The display device of claim 1, wherein the first, second, and third shorting bars are disposed in the same layer as the second connection wire line and comprise the same conductive material as the second connection wire line.

10. The display device of claim 1, wherein the display panel further comprises a first test pad, a second test pad, and a third test pad correspondingly connected to the first, second, and third shorting bars, respectively, and the first, second, and third test pads are configured to provide different test signals to corresponding shorting bars.

11. The display device of claim 10, wherein the different test signals comprise a red data test signal, a green data test signal, and a blue data test signal.

12. The display device of claim 1, further comprising first, second, and third data output pads respectively connected to the first, second, and third connection wire lines, wherein the output pads are arranged in in a staggered arrangement along at least three columns.

* * * * *